Patented Dec. 2, 1930

1,783,588

UNITED STATES PATENT OFFICE

MAXIMILIAN PAUL SCHMIDT, OF WIESBADEN, AND OTTO LIMPACH, OF BIEBRICH, GERMANY, ASSIGNORS TO GENERAL ANILINE WORKS, INC., OF NEW YORK, N. Y., A CORPORATION OF DELAWARE

ISATIN-CARBAZOLE COMPOUND VAT DYESTUFF

No Drawing. Application filed July 8, 1929, Serial No. 376,843, and in Germany July 21, 1928.

The present invention relates to a vat dyestuff.

According to the process described in German Patents No. 241,997 and 269,123 violet to black vat dyestuffs are obtained by condensing hydroxy-benzo-carbazoles with reactive isatin-α-derivatives.

Now we have found that a considerable improvement of the fastness properties of the dyestuffs in question is obtained when starting from the carbazole-N-substituted hydroxy-benzo-carbazoles. In this way a much greater fastness of the dyestuffs to chlorine, to light and to staining is obtained without detrimentally affecting the good properties inherent in this class of bodies—such as their great affinity for the fiber—being thereby diminished especially in so far as they are utilized for printing purposes.

The following example serves to illustrate our invention, but it is not intended to limit thereto; the parts being by weight:

247 parts of N-methyl-1.2-(1'-hydroxybenzo)-carbazole of the formula:

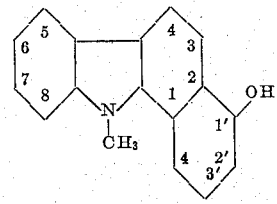

are heated together with 222 parts of isatin-α-anilid in acetic anhydride until there can no longer be detected in the mixture any anilid. After cooling the dyestuff thus obtained is filtered by suction and washed with alcohol. There is obtained a bluish-black crystalline powder which probably has the following formula:

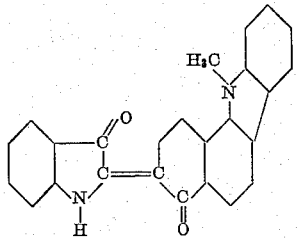

The powder yields with caustic soda solution and hydrosulfite a yellow vat dyeing wool and cotton a yellow tint which turns deep black when exposed to the air. The dyestuff shows essentially better fastness properties than that which has not been methylated.

We claim:

As a new product, the dyestuff of the following formula:

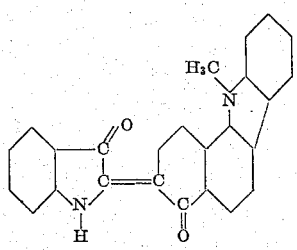

being a bluish-black crystalline powder, yielding with an aqueous alkali and hydrosulfite a yellow vat dyeing cotton and wool a yellow tint which turns deep black on exposure to the air.

In testimony whereof, we affix our signatures.

MAXIMILIAN PAUL SCHMIDT.
OTTO LIMPACH.